Patented Apr. 27, 1948

2,440,357

UNITED STATES PATENT OFFICE 2,440,357

PROCESS AND CULTURE MEDIA FOR PRODUCING PENICILLIN

Otto K. Behrens and Quentin F. Soper, Indianapolis, Ind., assignors to Eli Lilly and Company, Indianapolis, Ind., a corporation of Indiana No Drawing. Application August 24, 1945, Serial No. 612,528

8 Claims. (Cl. 195—36)

1

This invention relates to penicillin and more particularly to improvements in the production thereof.

An object of this invention is to provide a process whereby the production and yield of penicillin may be improved. Other objects will be apparent from the disclosures herein made.

Penicillin, a material produced by a Penicillium mold of the notatum-chrysogenum group, has become widely known within recent years for its remarkable therapeutic properties as an antibacterial agent.

The availability of penicillin has been retarded by the circumstances of its production. The penicillin formed, presumably as a metabolic product, by the growth of the mold under suitable conditions, has been produced slowly and in very small quantity. Furthermore, the mold has produced other products, chemically similar to penicillin, but without potent antibacterial properties. Thus the small quantity of penicillin and the presence of structurally similar compounds has rendered its isolation difficult.

One of the methods which has been employed commercially for the production of penicillin is that known as surface culture. In a common adaptation of this method a liquid nutrient medium is supplied to a large number of bottles which are supported in a substantially horizontal position. The nutrient medium is then inoculated with the Penicillium mold and the mold grows on the surface of the nutrient medium. In order to produce commercial quantities of penicillin by this method a large number of bottles is required and individual handling is necessary.

Another process which has been commercialized to some extent is that known as the bran process wherein Penicillium mold is grown on bran. The bran may be spread in thin layers on trays or may be agitated continuously in rotating drums. While the bran itself is a nutrient for the growth of the mold, it is common to associate additional nutrient materials therewith.

Probably the most widely used process at the present time for the production of penicillin is that ordinarily referred to as submerged or deep culture. The submerged culture process involves the growth of Penicillium mold in an aqueous nutrient medium and accompanied customarily by agitation. When the submerged culture process is carried out in small vessels such as flasks of relatively small capacity, the process is frequently referred to as the "shake" culture process because the agitation is brought about by continuously shaking the culture by suitable mechanical

2 means. When containers of larger capacity are employed, and such containers may have capacities running into the thousands of gallons, the agitation of the liquid nutrient medium is ordinarily accomplished in part by mechanical stirring and in part by aeration, which latter functions primarily to supply oxygen for the growth of the mold.

All of the above processes have been characterized in general by the slow production, and low yield, of penicillin.

By our invention the production of penicillin by a Penicillium mold of the notatum-chrysogenum group may be accelerated and the yield of penicillin increased.

According to the present invention penicillin is produced by growing a Penicillium mold of the notatum-chrysogenum group in a culture medium in the presence of a compound represented by the formula

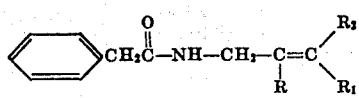

wherein $R$, $R_1$ and $R_2$ represent hydrogen, methyl or ethyl. Effective N-alkenylphenylacetamides within the scope of the above formula are: N-allylphenylacetamide, N-crotyl-phenylacetamide, N-(2-methylallyl)-phenylacetamide, N-(3-ethylallyl)-phenylacetamide and N-(3,3-dimethylallyl)-phenylacetamide. According to a preferred method the Penicillium mold and one or more of the N-alkenyl-phenylacetamides described above are associated with an aqueous culture medium containing nutrient material suitable for the growth and development of the mold and the mold is grown under penicillin-producing conditions. The N-alkenylphenylacetamide of the particular group described above is incorporated in the nutrient material in effective amount less than about 1 percent and preferably less than about 0.3 percent. The amount of material which accelerates the production of penicillin may accordingly be present in small amount although over a substantial range. For example, the method has been effectively carried out by associating about 0.014 percent of N-allyl-phenylacetamide and the Penicillium mold with a culture containing mold-growth-supporting material.

In another aspect there is provided by this invention a culture medium comprising mold-growth-supporting material and an N-alkenylphenylacetamide as set forth in the next preceding paragraph. In a preferred form the culture medium may comprise water, mold-growth-supporting material, and, in amount effective to accelerate the production of penicillin and less than about 1 percent, a compound as described above. The amount of the compound which accelerates the production of penicillin may vary substantially throughout the range indicated above. By way of example, the culture medium may contain about 0.014 percent of N-allyl-phenylacetamide.

The N-alkenyl-phenylacetamides employed in this invention are novel per se and are disclosed in detail and claimed in copending application, Serial No. 612,527, filed August 24, 1945.

The invention will now be described in detail in its present preferred application to the submerged culture process of producing penicillin.

In the submerged culture process, the culture medium comprises water and mold-growth-supporting material. The nutrient material may consist of ingredients known to those skilled in the art. A prominent constituent of one type of suitable nutrient material is that known as corn steep solids which is a by-product obtained in the manufacture of corn starch. Corn steep solids is a desirable material because of its low cost and its effectiveness in bringing about a relatively high yield of penicillin. On the other hand corn steep solids is of indeterminate chemical composition, some ingredients of which may make more difficult the isolation of the penicillin produced during the growth of the mold. With a major constituent such as corn steep solids there are ordinarily associated additional ingredients known to the art such as "Cerelose" (a refined corn sugar) lactose, and salts such as calcium carbonate and zinc sulfate. The exact function of the various ingredients is not known in detail, but it is known to those skilled in the art that the combination of such ingredients does bring about the production of penicillin when a Penicillium mold of the notatum-chrysogenum group is grown in such a culture medium under suitable conditions.

Another type of aqueous culture medium includes water and nutrient substances which, as contrasted with corn steep solids, are of a determinate chemical composition. Such ingredients include lactose, dextrose, acetic acid and salts such as sodium nitrate, ammonium nitrate, potassium dihydrogen phosphate, and magnesium sulfate. Compositions of this type are advantageous in that penicillin frequently is more readily separated from the other constituents of the culture medium and other products of the growth of the mold.

The mold employed for the production of penicillin is a Penicillium mold of the notatum-chrysogenum group, and illustratively a strain of this mold suitable for the purposes of this invention is that known as strain N. R. R. L. 1976.

The amounts of the N-alkenyl-phenylacetamides employed in carrying out this invention may vary to a substantial extent. In general the effective amount ranges up to about 10 g. per liter of culture medium, or in other words up to about 1 percent on a weight-volume basis, although generally it is preferred to employ the compound in an amount less than about 0.3 percent. The present optimum range is about 0.015 to 0.02 percent. In general there is no particular advantage to be gained by employing an amount of the N-alkenyl-phenylacetamide in substantial excess of the amount effective in promoting the production of penicillin by the mold.

N-alkenyl-phenylacetamide may be associated with the mold and culture medium at any suitable time. Thus the materials of the culture medium upon association in a suitable container may be inoculated with the Penicillium mold, and the phenylacetamide compound may be incorporated either before or shortly after the inoculation with the mold.

The culture medium, with the mold, and the compound accelerating the production of penicillin, should be maintained at a suitable temperature, for example in the range of 20–30° C. A range of temperature which has been found to be particularly suitable is from 24–28° C. The period of time during which the mold is grown will depend upon the objective desired. Thus the mold may be grown only during the period of its maximum rate of growth. Under such conditions the mold growth may be interrupted after a period of growth of from two to three days. On the other hand the mold may be grown to obtain the maximum yield of penicillin. In such case the mold may be grown for a longer period, for example for about four or five days.

The penicillin may be separated from the culture medium in any suitable manner. For example the penicillin may be adsorbed on a surface-active carbon. Alternatively the penicillin may be extracted by means of a suitable water-immiscible organic solvent such as amyl acetate. By well-known extractive procedures, the penicillin subsequently may be isolated in dry form as a salt thereof, for example the sodium or calcium salt.

By the practice of this invention the yield of penicillin has been substantially increased. Thus under comparative conditions the yield of penicillin has been increased from 40 to upwards of 70 per cent. This range is of course illustrative and lesser or greater yields are within the contemplation of the invention depending upon the conditions under which the penicillin is produced.

Specific examples further illustrating the invention particularly with respect to the deep culture process of producing penicillin are given below:

*Example 1*

A culture medium may be prepared as follows:

| | | |
|---|---|---|
| Lactose | Grams | 35 |
| Corn steep solids | do | 20 |
| Calcium carbonate | do | 2 |
| Zinc sulfate heptahydrate | do | 0.004 |
| M/50 phosphate buffer | cubic centimeters | 5 |
| Water, q. s | do | 1,000 |

0.14 g. of N-allyl-phenylacetamide, namely 0.014 percent on a weight-volume basis, were added to the above culture medium and the medium was inoculated with a Penicillium mold, strain N. R. R. L. 1976. The culture medium and mold were agitated continuously and the mold was permitted to grow for four days at 27° C. There was obtained penicillin to the extent of 174 Oxford units per cc. of culture medium.

By way of comparison when the Penicillium mold was grown under the same conditions but in the absence of N-allyl-phenylacetamide, the amount of penicillin produced was 116 Oxford units per cc. of culture medium.

From the above it will be seen that an increase in production of penicillin to the extent of 50 percent was accomplished in carrying out the production of penicillin in accordance with this invention.

Example 2

To a culture medium as shown in the table in Example 1 were added about 0.15 g., about 0.015 percent on a weight-volume basis, of N-crotyl-phenylacetamide, and the medium was inoculated with a Penicillium mold, strain N. R. R. L. 1976. The culture medium and mold were agitated continuously and the mold was permitted to grow for four days at 27° C. There was obtained penicillin to the extent of 173 Oxford units per cc. of culture medium.

By way of comparison, when the Penicillium mold was grown under the same conditions but in the absence of N-crotyl-phenylacetamide, the amount of penicillin produced was 100 Oxford units per cc. of culture medium.

From the above it will be seen that an increase in penicillin production to the extent of 73 percent was produced by the incorporation of the N-crotyl-phenylacetamide in the culture medium.

Example 3

A culture medium of the composition as shown in the table of Example 1 wherein is incorporated 0.016 percent of N-(3,3-dimethylallyl)-phenylacetamide on a weight-volume basis, when inoculated with the Penicillium mold, strain N. R. R. L. 1976, mechanically agitated and maintained at a temperature of about 27° C. for four days, produces a concentration of penicillin greater by 40 percent than is produced in the culture medium in the absence of N-(3,3-dimethylallyl)-phenylacetamide.

Example 4

A culture medium may be prepared comprising the following constituents:

| | | |
|---|---|---|
| Corn steep solids | pounds | 500 |
| "Cerelose" | do | 125 |
| Lactose | do | 500 |
| Calcium carbonate | do | 50 |
| Zinc sulfate heptahydrate | do | 1 |
| Water | gallons | 3,000 |

Addition of about 3 pounds of N-allyl-phenylacetamide, equivalent on a weight-volume basis to about 0.014 percent, inoculation of the culture medium with a Penicillium mold, strain N. R. R. L. 1976, and growth of the mold for four days at 27° C. produces a concentration of penicillin greater by 40 percent or more than is produced in the above culture medium under the same conditions of growth but in the absence of N-allyl-phenylacetamide.

In the above examples "corn steep solids" has been included as a constituent of the culture medium. Corn steep solids assists in the obtaining of higher yields of penicillin, but due in part to the heterogeneous nature of corn steep solids, difficulty is involved in the separation of penicillin from other constituents of the culture medium following the growth of the mold.

In the examples to follow the culture media do not contain corn steep solids and are of more precise chemical composition. The employment of such culture media may result in a lower yield of penicillin. On the other hand penicillin which is produced may be considerably more readily separated from the culture medium following the growth of the mold.

Example 5

A culture medium of the following composition was prepared:

| | | |
|---|---|---|
| Water | cubic centimeters | 1,000 |
| Lactose | grams | 25 |
| Dextrose | do | 5 |
| Sodium nitrate | do | 5 |
| Ammonium nitrate | do | 5 |
| Potassium dihydrogen phosphate | do | 1 |
| Magnesium sulfate | do | 0.25 |
| Acetic acid | do | 5 |

Addition of 0.14 g. of N-allyl-phenylacetamide, namely 0.014 percent on a weight-volume basis, added for the purposes of this invention to the above medium, inoculation with a Penicillium mold, strain N. R. R. L. 1976, and growth of the mold for six days at a temperature of about 27° C. with continuous mechanical agitation produces a penicillin concentration greater by 40 percent or more than is produced in the above in the absence of the N-allyl-phenylacetamide.

Example 6

Another example of a culture medium not embodying corn steep solids is as follows:

| | | |
|---|---|---|
| Potassium dihydrogen phosphate | grams | 1 |
| Dipotassium hydrogen phosphate | do | 1 |
| Magnesium sulfate heptahydrate | do | 1 |
| Sodium nitrate | do | 2 |
| Lactose | do | 10 |
| Zinc sulphate heptahydrate | do | 0.01 |
| Water, q. s | cubic centimeters | 2,000 |

(Adjusted to pH 6.5 with NaOH solution)

N-allyl-phenylacetamide was incorporated in the above culture medium to the extent of about 0.014 percent on a weight-volume basis and the medium inoculated with Penicillium mold, strain N. R. R. L. 1976. The composition was mechanically agitated for three days and maintained at a temperature of about 27° C. Penicillin was found to be present to the extent of about 39 Oxford units per cc. of culture medium.

By way of comparison under the same conditions except for the absence of N-allyl-phenylacetamide the penicillin production was only 20 Oxford units per cc. of culture medium.

From the above it will be seen that an increase in penicillin production of about 94 percent was obtained through the employment of N-allyl-phenylacetamide in the culture medium.

Example 7

Upon incorporation of 0.015 percent on a weight-volume basis of N-crotyl-phenylacetamide in a culture medium as shown in the table in Example 6 and under conditions of growth the same as shown in Example 6, penicillin is produced to the extent of 50 percent or more than is produced in the above culture medium and under the above conditions in the absence of N-crotyl-phenylacetamide.

Example 8

To a culture medium as shown in the table in Example 6, addition of 0.15 g., namely, 0.015 percent on a weight-volume basis of N-(2-methylallyl)-phenylacetamide, inoculation of the nutrient medium with a Penicillium mold strain N. R. R. L. 1976, and growth of the mold for six days at a temperature of about 27° C. with continuous mechanical agitation, produces a penicillin concentration greater by 35 percent or more than is produced in the above culture medium and under the same conditions of growth but in the absence of N-(2-methylallyl)-phenylacetamide.

As previously mentioned, compounds to be employed in carrying out this invention are novel and their preparation is disclosed in copending application, Serial No. 612,527, filed August 24, 1945. For purposes of convenience the preparation of certain of these compounds is given below:

*Preparation of N-allyl-phenylacetamide*

N-allyl-phenylacetamide represented by the formula

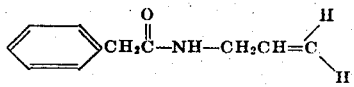

may be prepared as follows:

A mixture of 57 g. of allylamine and 150 g. of methyl phenylacetate is refluxed for about 2½ days. The methyl alcohol formed during the reaction is substantially completely removed by subjecting the reaction mixture to a vacuum while maintaining the reaction mixture at a temperature of about 50° C. whereupon the N-allyl-phenylacetamide separates in crystalline form. It is isolated by filtration, and is partially purified by recrystallization from dilute ethyl alcohol, and further purified by recrystallization from benzene. The N-allyl-phenylacetamide thus obtained melts at about 53–55° C. Analysis has shown the presence of 75.54 percent carbon, 7.42 percent hydrogen, and 7.92 percent nitrogen as compared with the calculated values of 75.40 percent carbon, 7.48 percent hydrogen, and 8.00 percent nitrogen.

*Preparation of N-crotyl-phenylacetamide*

N-crotyl-phenylacetamide represented by the formula

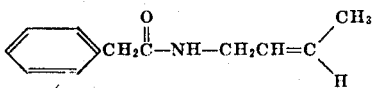

may be prepared as follows:

3.9 g. of crotylamine dissolved in 20 cc. of water are treated with 8.5 g. of phenylacetyl chloride which are added in about 1 cc. portions. Between each addition the mixture is shaken and maintained at a temperature below 25° C. by external cooling. During the addition of the phenylacetyl chloride the reaction mixture is maintained alkaline by the addition of small amounts of 40 percent sodium hydroxide solution. The precipitate of N-crotyl-phenylacetamide which separates during the reaction is removed by filtration. It is purified by recrystallization from 70 percent ethanol. The purified N-crotyl-phenylacetamide melts at about 57–59° C. Analysis has shown the presence of 76.09 percent carbon and 7.61 percent hydrogen as compared with the calculated values of 76.15 percent carbon and 7.99 percent hydrogen.

*Preparation of N-(3,3-dimethylallyl)-phenylacetamide*

N-(3,3-dimethylallyl)-phenylacetamide represented by the formula

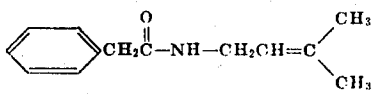

may be prepared as follows:

30 g. of phenylacetamide are dissolved in 200 cc. of dioxane and 7.8 g. of potassium are added. When all of the potassium has reacted, 29.8 g. of 3,3-dimethylallyl bromide are added slowly. The reaction mixture is allowed to stand for about 10 hours and is then warmed at about 100° C. for about one hour. The potassium bromide which separates is filtered off and the filtrate evaporated in vacuo yielding the N-(3,3-dimethylallyl)-phenylacetamide as a solid. This product is partially purified by recrystallization from dilute ethanol and is further purified by recrystallization from a mixture of benzene and petroleum ether. The N-(3,3-dimethylallyl)-phenylacetamide thus purified melts at about 66–68° C. Analysis has shown the presence of 76.84 percent carbon and 8.74 percent hydrogen as compared with the calculated values of 76.81 percent carbon and 8.43 percent hydrogen.

*Preparation of N-(2-methylallyl)-phenylacetamide*

N-(2-methylallyl)-phenylacetamide represented by the formula

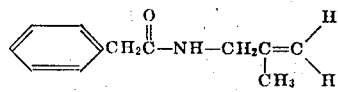

may be prepared as follows:

27 g. of phenylacetamide, 7.8 g. of potassium and 18.1 g. of 2-methallyl chloride are interreacted by the method used in the "Preparation of N-(3,3-dimethylallyl)-phenylacetamide". N-(2-methylallyl)-phenylacetamide melts at about 46–48° C. Analysis has shown the presence of 76.47 percent carbon, 8.25 percent hydrogen and 7.74 percent nitrogen as compared with the calculated values of 76.15 percent carbon, 7.99 percent hydrogen and 7.40 percent nitrogen.

What is claimed is:

1. The improved method of producing penicillin in submerged culture which comprises providing a culture medium containing a nutrient material and associating with said culture medium a Penicillium mold of the notatum-chrysogenum group and about 0.014 percent of N-allyl-phenylacetamide.

2. A culture medium for the production of penicillin in submerged culture through the growth of a Penicillium mold of the notatum-chrysogenum group, said culture medium comprising water, nutrient material dispersed in said water, and about 0.014 percent of N-allyl-phenyl-acetamide.

3. The method of producing penicillin in submerged culture, which comprises growing a Penicillium mold of the notatum-chrysogenum group in the presence of an effective amount less than about one percent of an N-alkenylphenyl acetamide of the group consisting of N-allyl-phenylacetamide, N-crotyl-phenylacetamide, N-(2-methylallyl)-phenylacetamide, N-(3-ethylallyl)-phenylacetamide and N-(3,3-dimethylallyl)-phenylacetamide.

4. The improved method of obtaining penicillin in submerged culture, which comprises providing an aqueous culture medium, associating with the said culture medium a Penicillium mold of the notatum-chrysogenum group and an effective amount less than about one percent of an N-alkenylphenylacetamide of the group consisting of N-allyl-phenylacetamide, N-crotyl-phenylacetamide, N-(2-methylallyl)-phenylacetamide, N-(3-ethylallyl)-phenylacetamide, and N-(3,3-dimethylallyl)-phenylacetamide.

5. In the method of producing penicillin in submerged culture by growing a Penicillium mold of the notatum-chrysogenum group in association with a nutrient material, the improvement which comprises incorporating in the nutrient material in effective amount less than about one percent, an N-alkenylphenylacetamide of the group consisting of N-allyl-phenylacetamide, N-crotyl - phenylacetamide, N - (2 - methylallyl) - phenylacetamide, N-(3-ethylallyl) - phenylacetamide and N-(3,3-dimethylallyl) - phenylacetamide.

6. The improved method of producing penicillin in submerged culture, which comprises providing a culture medium containing nutrient material and associating with said culture medium an effective amount less than about one percent of an N-alkenylphenylacetamide of the group consisting of N-allyl-phenylacetamide, N-crotyl-phenylactamide, N-(2-methylallyl)-phenylacetamide, N-(3-ethylallyl)-phenylacetamide, and N-(3,3-dimethylallyl)-phenylacetamide.

7. A culture medium for the production of penicillin in submerged culture through the growth of a Penicillium mold of the notatum chrysogenum group, said culture medium comprising nutrient material and an effective amount less than about one percent of an N-alkenylphenylacetamide of the group consisting of N-allyl - phenylacetamide, N - crotyl - phenylacetamide, N-(2-methyl-allyl)-phenylacetamide, N-(3-ethylallyl)-phenylacetamide and N-(3,3-dimethylallyl)-phenylacetamide.

8. A culture medium for the production of penicillin in submerged culture through the growth of a Penicillium mold of the notatum-chrysogenum group, said culture medium comprising water, nutrient material, and in amount effective to accelerate the production of penicillin and less than about one percent, an N-alkenylphenylacetamide of the group consisting of N-allyl - phenylacetamide, N - crotyl - phenylacetamide, N-(2-methylallyl)-phenylacetamide, N-(3-ethylallyl)-phenylacetamide and N-(3,3-dimethylallyl)-phenylacetamide.

OTTO K. BEHRENS.
QUENTIN F. SOPER.

REFERENCES CITED

The following references are of record in the file of this patent:

UNITED STATES PATENTS

| Number | Name | Date |
|---|---|---|
| 2,423,873 | Coghill | July 15, 1947 |

OTHER REFERENCES

Coghill, Monthly Progress Report No. 16, November 20, 1943, distributed by Committee on Medical Research, O. S. R. D., pages 1 and 2.

Pennsylvania, State College Penicillin Interim Report (45-124), March 30, 1945, page 1.